United States Patent
Shen (10) Patent No.: US 12,523,703 B2
(45) Date of Patent: Jan. 13, 2026

(54) BATTERY DISCHARGE UNDERVOLTAGE PROTECTION METHOD, BATTERY APPARATUS, AND ELECTRIC APPARATUS

(71) Applicant: Ningde Amperex Technology Limited, Ningde (CN)

(72) Inventor: Zhengbin Shen, Dongguan (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 114 days.

(21) Appl. No.: 18/512,128

(22) Filed: Nov. 17, 2023

(65) Prior Publication Data

US 2024/0085483 A1    Mar. 14, 2024

Related U.S. Application Data

(63) Continuation of application No. PCT/CN2021/095187, filed on May 21, 2021.

(51) Int. Cl.
 *G01R 31/374* (2019.01)
 *G01R 31/3835* (2019.01)
 *H02J 7/00* (2006.01)

(52) U.S. Cl.
 CPC ....... *G01R 31/374* (2019.01); *G01R 31/3835* (2019.01); *H02J 7/00306* (2020.01); *H02J 7/0048* (2020.01)

(58) Field of Classification Search
 None
 See application file for complete search history.

(56) References Cited

U.S. PATENT DOCUMENTS

| | | | |
|---|---|---|---|
| 2007/0118255 A1 | 5/2007 | Wakashiro et al. | |
| 2017/0250450 A1 | 8/2017 | Xie et al. | |
| 2018/0358661 A1 | 12/2018 | Yebka et al. | |

(Continued)

FOREIGN PATENT DOCUMENTS

| | | |
|---|---|---|
| CN | 103178600 A | 6/2013 |
| CN | 103852725 A | 6/2014 |
| CN | 107745644 A | 3/2018 |

(Continued)

OTHER PUBLICATIONS

International Search Report issued on Feb. 6, 2022, in corresponding International Patent Application No. PCT/CN2021/095187, 5 pages.

(Continued)

*Primary Examiner* — Jas A Sanghera
(74) *Attorney, Agent, or Firm* — Maier & Maier, PLLC (57) ABSTRACT

A battery discharge undervoltage protection method includes: acquiring a temperature and a first voltage of a battery; determining, based on the temperature, a depth of discharge of the battery; determining, based on the first voltage, a first remaining capacity proportion of the battery; and determining, based on the first remaining capacity proportion, the depth of discharge and a first undervoltage threshold, a second undervoltage threshold to increase a discharge capacity proportion of the battery, the first undervoltage threshold is a preset undervoltage threshold, and the second undervoltage threshold is a dynamically adjusted undervoltage threshold.

11 Claims, 7 Drawing Sheets

(56) References Cited

U.S. PATENT DOCUMENTS

2019/0265306 A1* 8/2019 Matsushita ........ G01R 31/3828
2020/0116796 A1   4/2020 Hsu

FOREIGN PATENT DOCUMENTS

| | | | |
|---|---|---|---|
| CN | 108279385 | A | 7/2018 |
| CN | 109991545 | A | 7/2019 |
| CN | 110618389 | A | 12/2019 |
| CN | 110927590 | A | 3/2020 |
| CN | 111332153 | A | 6/2020 |
| CN | 111880108 | A | 11/2020 |
| CN | 111913111 | A | 11/2020 |
| JP | 2000100290 | A | 4/2000 |
| JP | 2006081300 | A | 3/2006 |
| JP | 2007162657 | A | 6/2007 |
| JP | 2010028963 | A | 2/2010 |
| JP | 2010090726 | A | 4/2010 |
| JP | 2013209984 | A | 10/2013 |
| JP | 2014157778 | A | 8/2014 |
| JP | 2016170885 | A | 9/2016 |
| JP | 2016197955 | A | 11/2016 |

OTHER PUBLICATIONS

Notice of Refusal issued on Aug. 8, 2020, in correspondence Japanese Application No. 2021540790, 8 pages.
Extended Search Report issued on Jun. 28, 2024, in corresponding European Application No. 21940219.5, 8 pages.
Office Action issued on Nov. 4, 2024, in correspondence Chinese Application No. 202110559481.X, 14 pages.
Office Action issued on May 11, 2024, in correspondence Chinese Application No. 202110559481.X, 13 pages.
Office Action issued on Apr. 25, 2025, in correspondence Chinese Application No. 202110559481.X, 15 pages.
Office Action issued on Feb. 6, 2024, in correspondence Japanese Application No. 2021-540790, 6 pages.
Notice of Allowance issued on Sep. 17, 2024, in correspondence Japanese Application No. 2021-540790, 5 pages.
Office Action issued on Aug. 8, 2023, in correspondence Japanese Application No. 2021-540790, 8 pages.

* cited by examiner

BATTERY DISCHARGE UNDERVOLTAGE PROTECTION METHOD, BATTERY APPARATUS, AND ELECTRIC APPARATUS

CROSS REFERENCE TO THE RELATED APPLICATIONS

The present application is a continuation application of PCT International Application: PCT/CN2021/095187 filed on May 21, 2021, the disclosure of which is hereby incorporated by reference in its entirety.

TECHNICAL FIELD

This application relates to the field of battery technologies, and specifically relates to a battery discharge undervoltage protection method, a battery apparatus, and an electric apparatus.

BACKGROUND

At present, typically, fixed undervoltage protection points are set for undervoltage protection control for batteries. The fixed undervoltage protection points are set within a range of 2.8 V to 3.0 V. General protection points are set as follows: first-level undervoltage alarm is provided at 3.0 V, second-level undervoltage protection is provided at 2.9 V, and third-level undervoltage protection is provided at 2.8 V. However, when a battery is discharged under low-temperature conditions, the discharge capacity proportion of the battery decreases sharply, failing to meet the capacity requirements of the battery at low temperatures.

SUMMARY

In view of this, this application provides a battery discharge undervoltage protection method, a battery apparatus, and an electric apparatus, to resolve the problem of decreasing discharge capacity proportion of the battery at low temperatures.

A battery discharge undervoltage protection method according to an embodiment of this application includes: acquiring a temperature and a first voltage of a battery; determining, based on the temperature, a depth of discharge of the battery; determining, based on the first voltage, a first remaining capacity proportion of the battery; and determining, based on the first remaining capacity proportion, the depth of discharge and a first undervoltage threshold, a second undervoltage threshold to increase a discharge capacity proportion of the battery, where the first undervoltage threshold is a preset undervoltage threshold, and the second undervoltage threshold is a dynamically adjusted undervoltage threshold.

In an implementation, the determining, based on the temperature, a depth of discharge of the battery includes: determining a temperature range corresponding to the temperature; and determining, based on the temperature range, the depth of discharge corresponding to the temperature range.

In another implementation, the determining, based on the first voltage, a first remaining capacity proportion of the battery includes: determining, based on a parameter correspondence of the battery, the first remaining capacity proportion corresponding to the first voltage, where the parameter correspondence refers to a correspondence between a remaining capacity proportion and an open circuit voltage.

In another implementation, the determining, based on the first remaining capacity proportion, the depth of discharge and a first undervoltage threshold, a second undervoltage threshold includes: determining, based on the first remaining capacity proportion and the depth of discharge, a second remaining capacity proportion of the battery; determining, based on the parameter correspondence, a second voltage corresponding to the second remaining capacity proportion; determining, based on the second voltage and the first voltage, voltage variation of the battery; and determining, based on the voltage variation and the first undervoltage threshold, the second undervoltage threshold.

In another implementation, after the determining, based on the first remaining capacity proportion, the depth of discharge and a first undervoltage threshold, a second undervoltage threshold, the method further includes: acquiring a third voltage of the battery after discharge cutoff; and determining, based on the second undervoltage threshold and the third voltage, whether to perform undervoltage protection for the battery.

In another implementation, the determining, based on the second undervoltage threshold and the third voltage, whether to perform undervoltage protection for the battery includes: determining a fourth voltage based on the third voltage; and determining to perform undervoltage protection for the battery under the condition that the fourth voltage is less than the second undervoltage threshold.

In another implementation, before the determining, based on a parameter correspondence of the battery, the first remaining capacity proportion corresponding to the first voltage, the method further includes: charging the battery until a capacity of the battery reaches a full-charge capacity; acquiring a full-charge voltage corresponding to the full-charge capacity; discharging the battery until a voltage of the battery reaches a discharge cut-off voltage; acquiring a voltage and a state of charge corresponding to the voltage of the battery during discharging; and determining the parameter correspondence based on the voltage and the state of charge corresponding to the voltage.

In another implementation, the determining, based on the first remaining capacity proportion and the depth of discharge, a second remaining capacity proportion of the battery includes: determining, based on the first remaining capacity proportion, a first discharge capacity proportion of the battery; and determining, based on the first discharge capacity proportion and the depth of discharge, the second remaining capacity proportion.

A battery apparatus according to another embodiment of this application includes a battery, a processor, and a memory, where the memory stores a computer program; and when the computer program is executed by the processor, the battery discharge undervoltage protection method according to the foregoing embodiment of this application is implemented.

An electric apparatus according to another embodiment of this application includes a load and the battery apparatus according to the foregoing embodiment of this application, where the battery apparatus is configured to provide electrical energy for the load.

In an implementation, the electric apparatus includes any one of a drone, an electric vehicle, an electric tool, and an energy storage product.

In some embodiments of this application, the second undervoltage threshold is determined based on the temperature, first voltage, and first undervoltage threshold of the battery, and then undervoltage thresholds within different temperature ranges are determined, so as to select different undervoltage thresholds from different temperature ranges. In this way, dynamic adjustment of the undervoltage threshold is achieved, thus increasing the discharge capacity proportion of the battery at low temperatures. Moreover, in some embodiments of this application, whether to perform undervoltage protection for the battery is determined based on the second undervoltage threshold and the third voltage of the battery after discharge cutoff, avoiding early undervoltage protection for the battery, and guaranteeing the discharge capacity proportion of the battery at low temperatures.

REFERENCE SIGNS OF MAIN COMPONENTS

| | |
|---|---|
| 10 | electric apparatus |
| 11 | load |
| 20 | battery apparatus |
| 21 | memory |
| 22 | processor |
| 23 | battery |
| 24 | sensor |

DETAILED DESCRIPTION

To understand the foregoing objectives, features, and advantages of this application more clearly, the following describes this application in detail with reference to the accompanying drawings and specific embodiments. It should be noted that, without conflict, some embodiments and the features in these embodiments of this application may be combined with each other. Various details are elaborated in the following description for full understanding of this application. The described embodiments are merely some but not all of the embodiments of this application.

It should be noted that although the flowchart illustrates a logic sequence, in some cases, the illustrated or described steps may be implemented in a sequence differing from that in the flowchart. The method disclosed in some embodiments of this application includes one or more steps or actions for implementing the method. The steps and/or actions of the method may be interchangeably performed without departing from the scope of the claims. In other words, unless a particular sequence is specified for the steps or actions, the sequence and/or use of specific steps and/or actions can be modified without departing from the scope of the claims.

Figure 1:
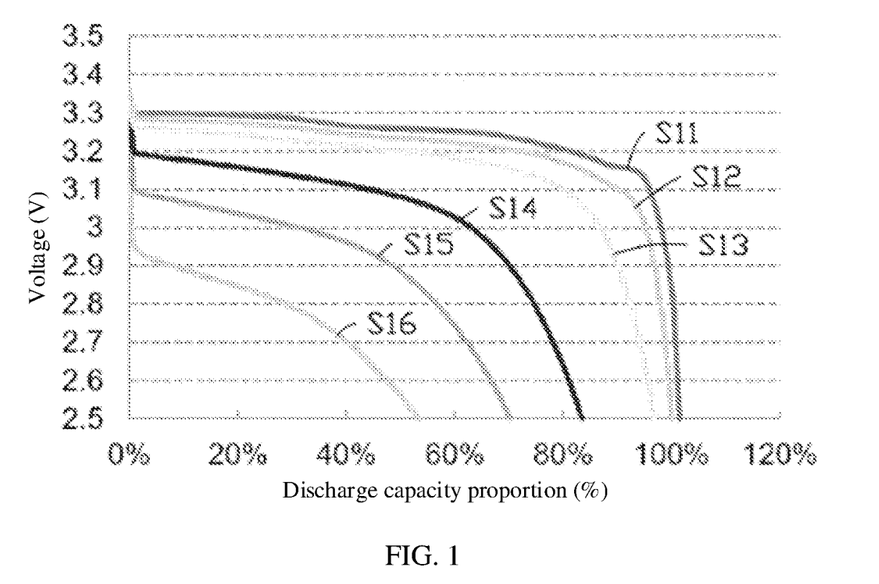
FIG. 1 is a curve graph showing voltages and discharge capacity proportions of a battery at different temperatures.

FIG. 1 is a curve graph showing voltages and discharge capacity proportions of a battery at different temperatures. S11 is a curve showing voltages and discharge capacity proportions at a discharge rate of 0.3 C at 45° C. S12 is a curve showing voltages and discharge capacity proportions at the discharge rate of 0.3 C at 25° C. S13 is a curve showing voltages and discharge capacity proportions at the discharge rate of 0.3 C at 15° C. S14 is a curve showing voltages and discharge capacity proportions at the discharge rate of 0.3 C at 0° C. S15 is a curve showing voltages and discharge capacity proportions at the discharge rate of 0.3 C at −10° C. S16 is a curve showing voltages and discharge capacity proportions at the discharge rate of 0.3 C at −20° C.

As shown in FIG. 1, under a same discharge rate (for example, 0.3 C), the battery has different discharge capacity proportions at different temperatures. As the temperature decreases, the discharge capacity proportion of the battery decreases sharply.

In some embodiments of this application, temperature refers to an ambient temperature, and the battery being at different temperatures means that the battery is at different ambient temperatures.

In some embodiments of this application, voltage refers to an open circuit voltage (Open Circuit Voltage, OCV) of the battery, that is, a terminal voltage of the battery in an open-circuit state.

In some embodiments of this application, the discharge capacity proportion refers to a proportion of discharge capacity of the battery compared to its rated capacity.

Table 1 shows the discharge capacity proportions of the battery at different temperatures. Referring to FIG. 1 and Table 1, firstly, the battery is charged at a same charge rate (for example, 0.3 C) at a same temperature (for example, 25° C.). Secondly, the battery is discharged at a same discharge rate (for example, 0.3 C) at different temperatures until the voltage of the battery reaches a discharge cut-off voltage (for example, 2.5 V). Lastly, the discharge capacity proportion of the battery is determined. It can be learned from Table 1 that as the temperature decreases, the discharge capacity proportion of the battery decreases sharply.

TABLE 1

Discharge capacity proportions of battery at different temperatures

| Item | Charge/discharge rate | Discharge cut-off voltage | Discharge capacity proportion |
|---|---|---|---|
| Discharge capacity proportions at charge/ discharge rate of 0.3 C under different temperatures | Charge CC: 25° C., 0.3 C Discharge DC: 45° C., 0.3 C | 2.5 V | 102% |
| | Charge CC: 25° C., 0.3 C Discharge DC: 25° C., 0.3 C | | 100.0% |
| | Charge CC: 25° C., 0.3 C Discharge DC: 15° C., 0.3 C | | 96.5% |
| | Charge CC: 25° C., 0.3 C Discharge DC: 0° C., 0.3 C | | 83% |
| | Charge CC: 25° C., 0.3 C Discharge DC: −10° C., 0.3 C | | 70% |
| | Charge CC: 25° C., 0.3 C Discharge DC: −20° C., 0.3 C | | 54% |

As the discharge capacity proportion of the battery at low temperatures decreases sharply, the discharge capacity proportion of the battery at low temperatures cannot meet the requirements.

In view of this, this application provides a battery discharge undervoltage protection method, a battery apparatus, and an electric apparatus, so as to increase the discharge capacity proportion of the battery at low temperatures.

Figure 2:
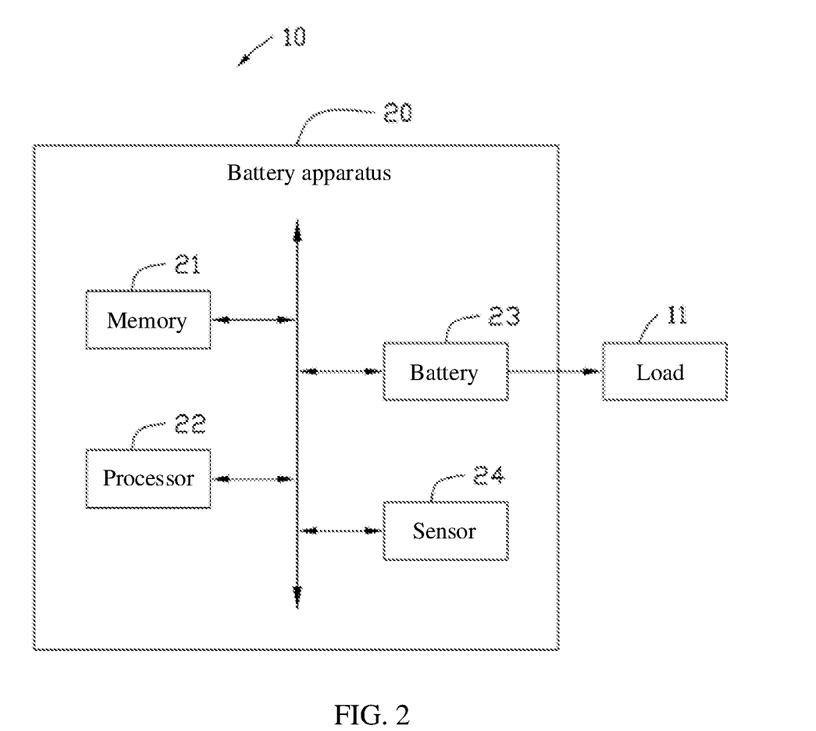
FIG. 2 is a block diagram of a battery apparatus according to an embodiment of this application.

FIG. 2 is a block diagram of a battery apparatus 20. As shown in FIG. 2, the battery apparatus 20 includes a memory 21, a processor 22, a battery 23, and a sensor 24. These components may be connected through buses or may be connected directly.

The memory 21 is configured to store program code and various data and to implement access to programs or data during running of the battery apparatus 20. The memory 21 may be an internal memory of the battery apparatus 20, that is, a memory built in the battery apparatus 20. In other implementations, the memory 21 may alternatively be an external memory of the battery apparatus 20, that is, a memory externally connected to the battery apparatus 20.

The memory 21 includes volatile or non-volatile storage devices, for example, digital versatile discs (Digital Versatile Disc, DVD), other discs, hard disks, smart media cards (Smart Media Card, SMC), secure digital (Secure Digital, SD) cards, and flash cards (Flash Card).

The processor 22 includes a central processing unit (Central Processing Unit, CPU), a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like.

In an implementation, the battery 23 is a rechargeable battery configured to provide electrical energy for the battery apparatus 20. For example, the battery 23 may be a lead-acid battery, a nickel-cadmium battery, a nickel-metal hydride battery, a lithium-ion battery, a lithium polymer battery, a lithium iron phosphate battery, or the like. The battery 23 includes a cell. The sensor 24 may be disposed on a surface of the cell and is configured to acquire an ambient temperature by measuring the temperature of the surface of the cell. In an implementation, the sensor 24 is a negative temperature coefficient (Negative Temperature Coefficient, NTC) thermistor. It can be understood that the battery apparatus 20 may further include other sensors, for example, a voltage sensor, a current sensor, a light sensor, a gyroscope, a hygrometer, and an infrared sensor.

It can be understood that the battery apparatus 20 may alternatively include more or fewer components or have a different configuration of components. The battery apparatus 20 may be used in an electric apparatus 10. The electric apparatus 10 includes but is not limited to a drone, an electric vehicle, an electric tool, and an energy storage product. The electric tool includes but is not limited to an electric screw driver, an electric drill, an electric wrench, an angle grinder, a steel rolling mill, an electric pick, an electric hammer, a marble cutter, and a jig saw. The energy storage product includes but is not limited to a mobile phone, a tablet computer, an e-reader, a computer, a work station, a server, a personal digital assistant (Personal Digital Assistant, PDA), a portable multimedia player (Portable Multimedia Player, PMP), a mobile medical device, a camera, a wearable device, a photovoltaic inverter, a wind power converter, an energy storage system, a new energy vehicle drive system, and a photovoltaic device.

In an implementation, the electric apparatus 10 includes the battery apparatus 20 and a load 11, where the battery apparatus 20 is configured to provide electrical energy for the load 11.

The load 11 includes but is not limited to a refrigerator, a cold drink machine, an air conditioner, a fan, an exhaust fan, an air cooling and heating machine, an air dehumidifier, a laundry machine, a clothes dryer, an electric iron, a vacuum collector, a floor waxing machine, a microwave oven, an induction cooker, an electric oven, a rice cooker, a dishwasher, an electric water heater, an electric blanket, am electric quilt, electric clothes, a space heater, an electric razor, an electric hair dryer, a curling iron, an ultrasonic facial cleaner, an electric massager, a mini projector, a television, a radio, a tape recorder, a video recorder, a camera, a combination stereo, a smoke alarm, an electric bell, an electric lamp, and a computer.

In an implementation, the battery apparatus 20 further includes a battery management system (Battery Management System, BMS). The battery 23 is connected to the processor 22 through the battery management system, so as to implement functions such as charging, discharging, and power consumption management through the battery management system. The battery management system may be in communication connection with a power conversion system (Power Conversion System, PCS).

Figure 3:
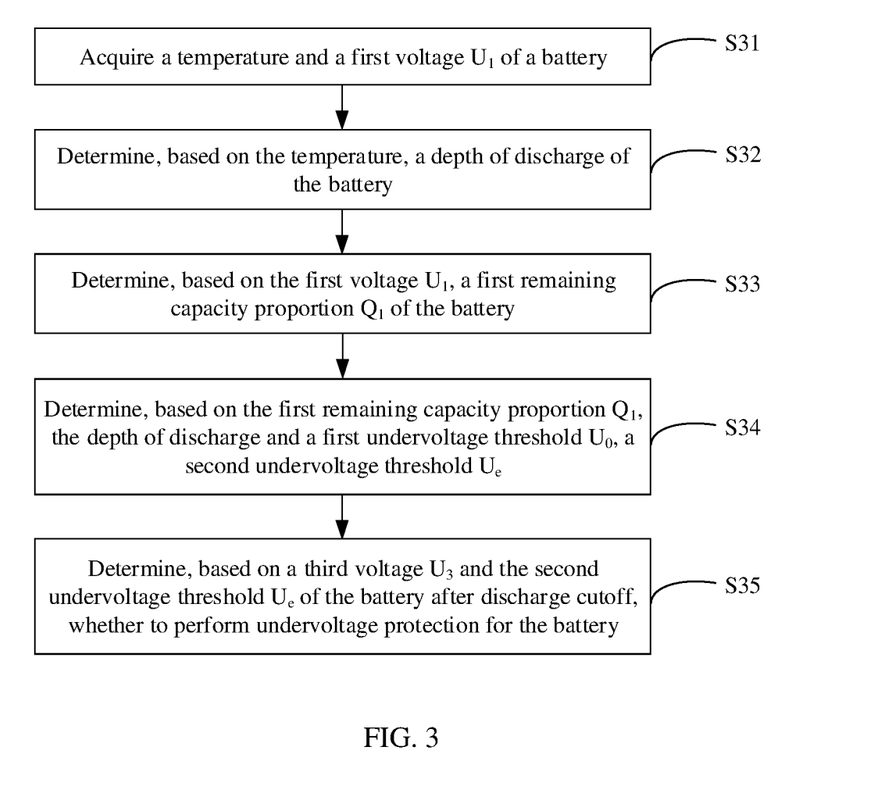
FIG. 3 is a flowchart of a battery discharge undervoltage protection method according to an embodiment of this application.

FIG. 3 is a flowchart of a battery discharge undervoltage protection method according to an embodiment. The battery discharge undervoltage protection method includes the following steps.

S31. Acquire a temperature and a first voltage $U_1$ of the battery 23.

In this embodiment, the temperature of the battery 23 refers to a temperature of an environment in which the battery 23 is located. When the battery 23 is in an idle state, the temperature and the first voltage $U_1$ of the battery 23 are acquired. The idle state refers to a state in which the battery 23 has a charge or discharge current approaching 0 A. In an implementation, a state in which the battery 23 has a charge or discharge current of less than 0.5 A is defined as the idle state.

Specifically, the battery apparatus 20 acquires the temperature (for example, any temperature within −20° C. to 50° C.) of the battery 23 through the sensor 24. The battery apparatus 20 acquires the first voltage $U_1$ (for example, any voltage within 2.0 V to 3.6 V) of the battery 23 through the battery management system.

In this embodiment, the battery apparatus 20 can acquire the temperature and first voltage $U_1$ of the battery 23 in real time or acquire the temperature and first voltage $U_1$ of the battery 23 according to a preset time interval (for example, 1 s or 2 s). The preset time interval may be determined according to specific requirements.

S32. Determine, based on the temperature, a depth of discharge (Depth of Discharge, DOD) of the battery 23.

In this embodiment, the depth of discharge (DOD) refers to a proportion of discharge capacity of the battery 23 compared with its rated capacity. It can be understood that in this embodiment of this application, a value of the depth of discharge of the battery 23 is equal to a value of the discharge capacity proportion.

In an implementation, the battery apparatus 20 determines, based on the acquired temperature, a temperature range corresponding to the temperature. It can be understood that the depth of discharge is in certain correspondence with the temperature range. When the battery 23 is in different temperature ranges, its depth of discharge also varies accordingly. When the temperature range is determined, the depth of discharge is also determined accordingly. For example, when the temperature range is 15° C. to 45° C., the depth of discharge is 95%. When the temperature range is −20° C. to −10° C., the depth of discharge is 70%.

It can be understood that the correspondence between the depth of discharge and the temperature range may be determined according to design requirements of the battery 23. For example, the depths of discharge of the battery 23 within different temperature ranges may be preset at the beginning of the design of the battery 23.

S33. Determine, based on the first voltage $U_1$, a first remaining capacity proportion $Q_1$ of the battery 23.

In this embodiment, the remaining capacity proportion Q is in certain correspondence with open circuit voltage U of the battery 23. When a value of the open circuit voltage U is determined, a value of the remaining capacity proportion Q is also determined correspondingly. For example, when the open circuit voltage U is 3.6 V, the remaining capacity proportion Q is 100%. When the open circuit voltage U is 3.3 V, the remaining capacity proportion Q is 80%.

In this embodiment, the remaining capacity proportion Q refers to a proportion of a remaining capacity of the battery 23 compared to its rated capacity. It can be understood that in this embodiment of this application, a sum of the value of the remaining capacity proportion Q and the value of the discharge capacity proportion of the battery 23 is 100%.

It can be understood that the correspondence between the remaining capacity proportion Q and the open circuit voltage U may be determined according to design requirements of the battery 23. For example, the correspondence between the remaining capacity proportion Q and the open circuit voltage U may be preset at the beginning of the design of the battery 23. In an implementation, the correspondence between the remaining capacity proportion Q and the open circuit voltage U is a positive correlation.

In an implementation, the battery apparatus 20 determines, based on a parameter correspondence of the battery 23, the first remaining capacity proportion $Q_1$ corresponding to the first voltage $U_1$. The parameter correspondence refers to a correspondence between the remaining capacity proportion Q and the open circuit voltage U.

In this embodiment of this application, the first voltage $U_1$ as well as a second voltage $U_2$, a third voltage $U_3$ and a fourth voltage $U_4$ described below are all open circuit voltage values of the battery 23.

Figure 4:
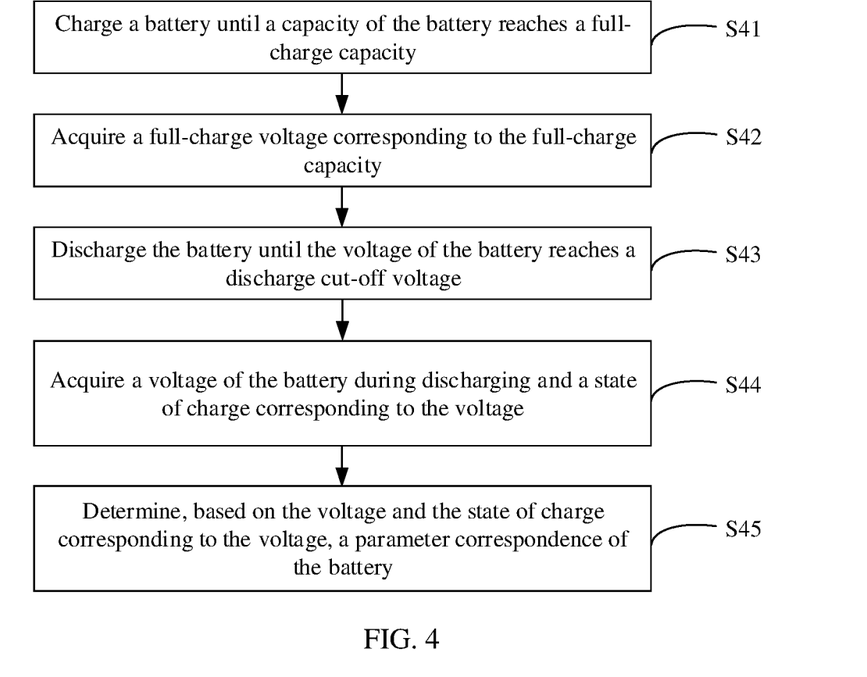
FIG. 4 is a flowchart of a battery discharge undervoltage protection method according to another embodiment of this application.

In an implementation, referring to FIG. 4, before step S33, the battery discharge undervoltage protection method may further include the following steps.

S41. Charge the battery 23 until the capacity of the battery 23 reaches a full-charge capacity.

In this embodiment, the full-charge capacity refers to a situation that the state of charge (State of Charge, SOC) of the battery 23 is 100%.

In this embodiment, the battery apparatus 20 may charge the battery 23 in a constant-current charging (Constant-Current Charging, CC) manner, in a constant-voltage charging (Constant-Voltage Charging, CV) manner, or in a constant-current and constant-voltage charging (CC-CV) manner. It can be understood that the charging manner of the battery 23 is not limited in this application.

S42. Acquire a full-charge voltage corresponding to the full-charge capacity.

In this embodiment, when a charge current is not greater than a preset charge rate (for example, 0.05 C) and the capacity of the battery 23 reaches the full-charge capacity, the battery apparatus 20 acquires a voltage of the battery 23, where this voltage is the full-charge voltage.

S43. Discharge the battery 23 until the voltage of the battery 23 reaches a discharge cut-off voltage.

In this embodiment, the discharge cut-off voltage refers to a voltage at which discharge of the battery 23 is stopped for preventing overdischarge of the battery 23.

It can be understood that the discharge cut-off voltage may be determined according to design requirements of the battery 23. For example, when the temperature range is 15° C. to 45° C., the discharge cut-off voltage is preset to 2.8 V. When the temperature range is −20° C. to −10° C., the discharge cut-off voltage is preset to 2.1 V.

In this embodiment, the battery apparatus 20 may discharge the battery 23 at a preset discharge rate (for example, 0.3 C, 0.5 C, or 1.0 C). It can be understood that a value of the preset discharge rate is not limited in this application.

S44. Acquire a voltage and a state of charge (SOC) corresponding to the voltage of the battery 23 during discharging.

In this embodiment, during discharging of the battery 23, the battery apparatus 20 may acquire the voltage of the battery 23 and the state of charge (SOC) corresponding to the voltage in real time through the battery management system. A value of the state of charge (SOC) is equal to a value of the remaining capacity proportion Q.

S45. Determine, based on the voltage and the state of charge (SOC) corresponding to the voltage, the parameter correspondence of the battery 23.

In this embodiment, the parameter correspondence refers to a correspondence between the remaining capacity proportion Q and the open circuit voltage U.

In this embodiment, the battery apparatus 20 may perform fitting, based on the voltage of the battery 23 during discharging and the state of charge (SOC) corresponding to the voltage, to obtain a characteristic curve of open circuit voltage and state of charge (OCV-SOC) of the battery 23.

It can be understood that a characteristic curve of open circuit voltage U and remaining capacity proportion Q (that is, the parameter correspondence) of the battery 23 is the same as the characteristic curve of open circuit voltage and state of charge (OCV-SOC).

It can be understood that the foregoing steps S41 to S45 are specific steps for acquiring the parameter correspondence of the battery 23 in an implementation.

S34. Determine, based on the first remaining capacity proportion $Q_1$, the depth of discharge and a first undervoltage threshold $U_0$, a second undervoltage threshold $U_e$.

In this embodiment of this application, the first undervoltage threshold $U_0$ is a preset undervoltage threshold (for example, 2.8 V, 2.9 V, or 3.0 V), and the second undervoltage threshold $U_e$ is a dynamically adjusted undervoltage threshold (for example, 2.1 V, 2.2 V, or 2.4 V).

Figure 5:
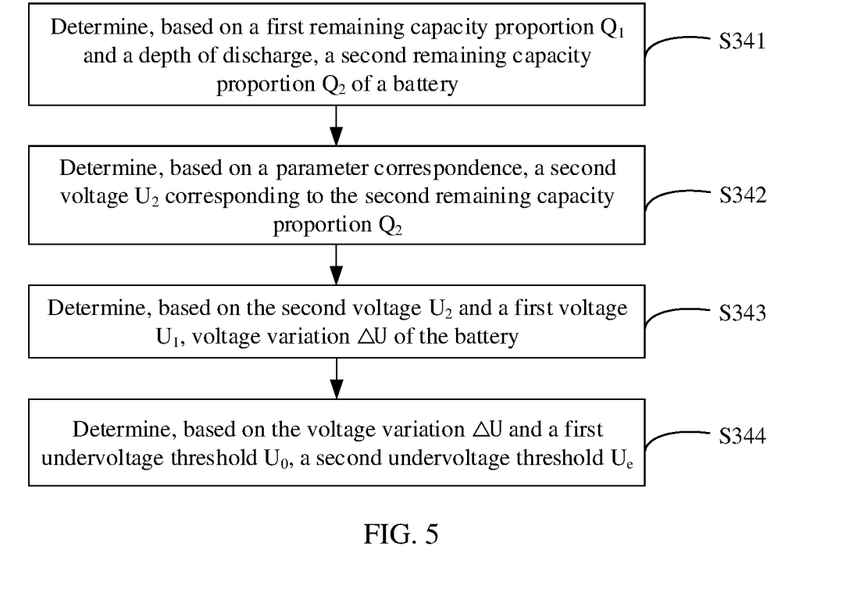
FIG. 5 is a flowchart of a battery discharge undervoltage protection method according to still another embodiment of this application.

In an implementation, referring to FIG. 5, step S34 may include the following sub-steps.

S341. Determine, based on the first remaining capacity proportion $Q_1$ and the depth of discharge, a second remaining capacity proportion $Q_2$ of the battery 23.

In this embodiment, the battery apparatus 20 may determine, based on the first remaining capacity proportion $Q_1$ and the depth of discharge, the second remaining capacity proportion $Q_2$ of the battery 23.

Figure 6:
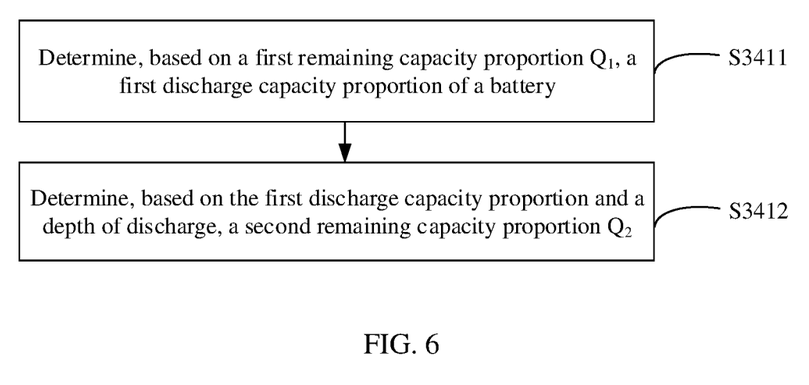
FIG. 6 is a flowchart of a battery discharge undervoltage protection method according to yet another embodiment of this application.

In an implementation, referring to FIG. 6, step S341 may include the following sub-steps.

S3411. Determine, based on the first remaining capacity proportion $Q_1$, a first discharge capacity proportion of the battery 23.

In this embodiment, a sum of the first remaining capacity proportion $Q_1$ and the first discharge capacity proportion is 100%. The first discharge capacity proportion may be calculated as (100%–$Q_1$) based on the first remaining capacity proportion $Q_1$.

S3412. Determine, based on the first discharge capacity proportion and the depth of discharge, the second remaining capacity proportion $Q_2$.

In this embodiment, the depth of discharge is preset to $DOD_x$, and when the first discharge capacity proportion is equal to the depth of discharge (that is, 100%–$Q_1$=$DOD_x$), it indicates that a current temperature does not affect the discharge capacity proportion of the battery 23, and the second remaining capacity proportion $Q_2$ is equal to the first remaining capacity proportion $Q_1$ (that is, $Q_2$=$Q_1$). In this case, the first undervoltage threshold $U_0$ does not need to be adjusted.

When the first discharge capacity proportion is less than the depth of discharge (that is, 100%–$Q_1$<$DOD_x$), it indicates that a current temperature results in a decrease in the discharge capacity proportion of the battery 23, and the second remaining capacity proportion $Q_2$=100%–$DOD_x$. In this case, the first undervoltage threshold $U_0$ needs to be reduced, to be specific, the first undervoltage threshold $U_0$ is adjusted to the second undervoltage threshold $U_e$ so as to increase the discharge capacity proportion of the battery 23.

It can be understood that due to the influence of low temperatures, the first discharge capacity proportion of the battery 23 decreases compared to the preset depth of discharge $DOD_x$. In other words, the battery 23 loses part of the discharge capacity proportion under low temperatures, that is, $DOD_x$–(100%–$Q_1$). In order to increase the discharge capacity proportion of the battery 23 under low temperatures, the first undervoltage threshold $U_0$ needs to be reduced to compensate for the loss of the discharge capacity proportion of the battery 23 under low temperatures.

It can be understood that after the first undervoltage threshold $U_0$ is reduced (that is, after the discharge cut-off voltage is reduced), the battery 23 can discharge a larger capacity.

S342. Determine, based on the parameter correspondence, a second voltage $U_2$ corresponding to the second remaining capacity proportion $Q_2$.

In this embodiment, the battery apparatus 20 may determine, based on the parameter correspondence of the battery 23, the second voltage $U_2$ corresponding to the second remaining capacity proportion $Q_2$.

It can be understood that when the first discharge capacity proportion is less than the depth of discharge (that is, 100%–$Q_1$<$DOD_x$), the first remaining capacity proportion $Q_1$ is greater than the second remaining capacity proportion $Q_2$ (that is, $Q_1$>$Q_2$). Correspondingly, the first voltage $U_1$ is greater than the second voltage $U_2$ (that is, $U_1$>$U_2$).

S343. Determine, based on the second voltage $U_2$ and the first voltage $U_1$, voltage variation $\Delta U$ of the battery 23.

In this embodiment, the voltage variation $\Delta U$=$U_1$–$U_2$ of the battery 23 is $U_1$–$U_2$. It can be understood that the voltage variation $\Delta U$ is resulted from the influence of low temperatures on the battery 23.

S344. Determine, based on the voltage variation $\Delta U$ and the first undervoltage threshold $U_0$, the second undervoltage threshold $U_e$.

In this embodiment, to compensate for the loss of the discharge capacity proportion (that is, $DOD_x$–(100%–$Q_1$)) of the battery 23 at low temperatures, the second undervoltage threshold $U_e$=$U_0$–$\Delta U$.

It can be understood that when the first undervoltage threshold $U_0$ is adjusted to the second undervoltage threshold $U_e$=$U_0$–$\Delta U$, a capacity proportion for subsequent discharge of the battery 23 is $DOD_x$–(100%–$Q_1$).

Figure 7:
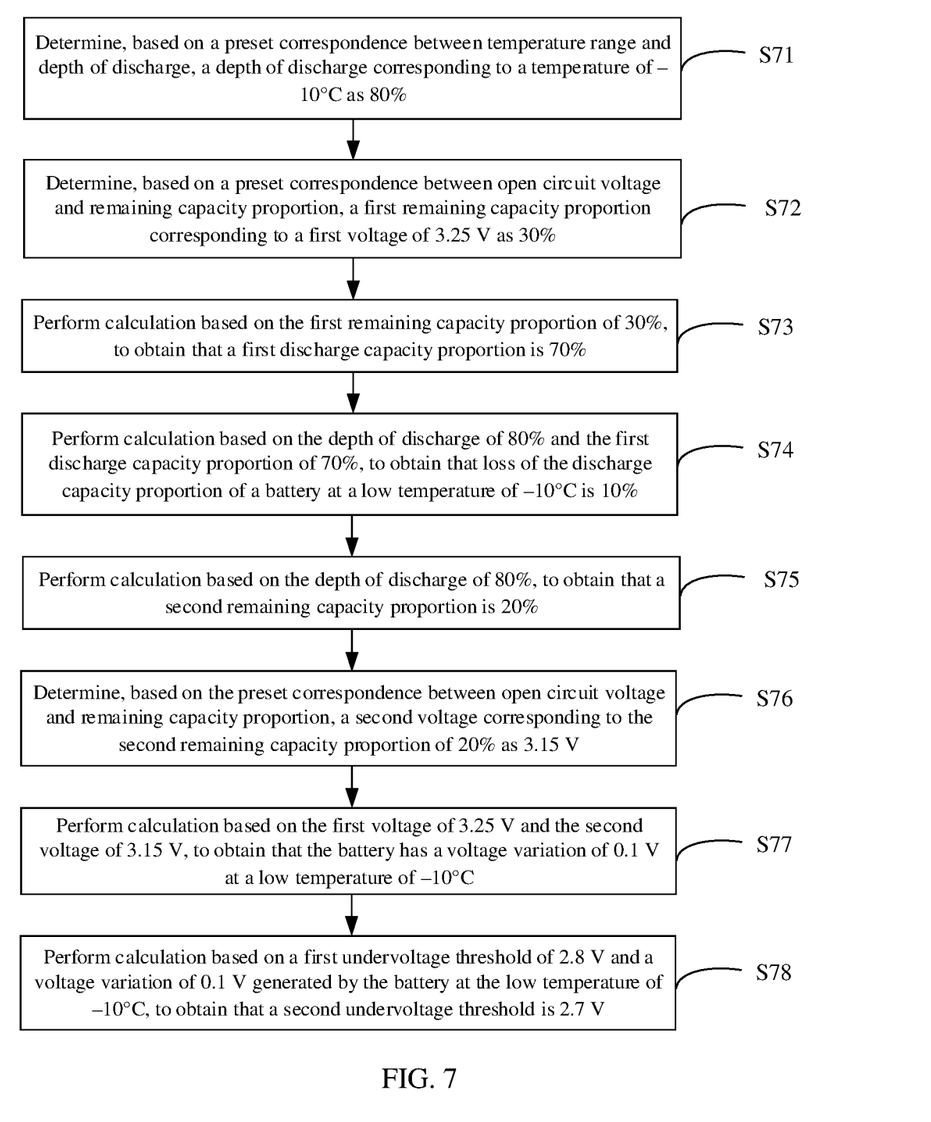
FIG. 7 is a flowchart of a battery discharge undervoltage protection method according to still yet another embodiment of this application.

Refer to FIG. 7. FIG. 7 is a flowchart of a battery discharge undervoltage protection method according to an embodiment of this application. It is assumed that the discharge rate is 0.3 C, the temperature of the battery 23 is –10° C., the first voltage is 3.25 V, and the preset first undervoltage threshold is 2.8 V.

It can be understood that when the value of the discharge rate varies, the value of the first undervoltage threshold should be adjusted accordingly.

The battery discharge undervoltage protection method includes the following steps.

S71. Determine, based on a preset correspondence between temperature range and depth of discharge, a depth of discharge corresponding to a temperature of –10° C. as 80%.

In this embodiment, based on the preset correspondence between the temperature range and the depth of discharge, the depths of discharge corresponding to temperatures within –10° C. to 0° C. are all 80%.

S72. Determine, based on a preset correspondence between open circuit voltage and remaining capacity proportion, a first remaining capacity proportion corresponding to a first voltage of 3.25 V as 30%.

In this embodiment, the correspondence between open circuit voltage and remaining capacity proportion is a positive correlation. Based on a characteristic curve of the preset open circuit voltages and remaining capacity proportions, it can be determined that the first remaining capacity proportion corresponding to the first voltage of 3.25 V is 30%.

S73. Perform calculation based on the first remaining capacity proportion of 30%, to obtain that a first discharge capacity proportion is 70%.

In this embodiment, a sum of the first remaining capacity proportion and the first discharge capacity proportion is 100%.

S74. Perform calculation based on the depth of discharge of 80% and the first discharge capacity proportion of 70%, to obtain that the loss of the discharge capacity proportion of the battery 23 at a low temperature of –10° C. is 10%.

In this embodiment, the discharge capacity proportion of the battery 23 decreases at low temperatures. In this embodiment, the discharge capacity proportion of the battery 23 at a low temperature of –10° C. decreases by 10%.

S75. Perform calculation based on the depth of discharge of 80%, to obtain that a second remaining capacity proportion is 20%.

In this embodiment, a sum of the depth of discharge and the second remaining capacity proportion is 100%.

S76. Determine, based on the preset correspondence between open circuit voltage and remaining capacity proportion, a second voltage corresponding to the second remaining capacity proportion of 20% as 3.15 V.

In this embodiment, based on a characteristic curve of the preset open circuit voltage and remaining capacity proportion, the second voltage corresponding to the second remaining capacity proportion of 20% can be determined as 3.15 V.

S77. Perform calculation based on the first voltage of 3.25 V and the second voltage of 3.15 V, to obtain that the battery 23 has a voltage variation of 0.1 V at a low temperature of –10° C.

It can be understood that the voltage variation of 0.1 V generated by the battery 23 at the low temperature of –10° C. corresponds to the loss of 10% of the discharge capacity proportion.

S78. Perform calculation based on the first undervoltage threshold of 2.8 V and the voltage variation of 0.1 V generated by the battery 23 at the low temperature of –10° C., to obtain that the second undervoltage threshold is 2.7 V.

It can be understood that when the first undervoltage threshold of 2.8 V is adjusted to the second undervoltage threshold of 2.7 V, a capacity proportion for subsequent discharge of the battery 23 is 10%, which can compensate for the loss of 10% of the discharge capacity proportion of the battery 23 at the low temperature of –10° C.

It can be understood that the foregoing steps S71 to S78 are specific steps for determining an undervoltage threshold required when the battery 23 is at the low temperature of –10° C. in an implementation. All parameter values in the foregoing steps S71 to S78 are exemplary values. In other words, in other scenarios, the parameter values measured and calculated by the battery apparatus 20 vary accordingly with different preset parameter values. In other implementations, the dynamically adjusted undervoltage threshold may be determined according to specific application scenarios.

Figure 8:
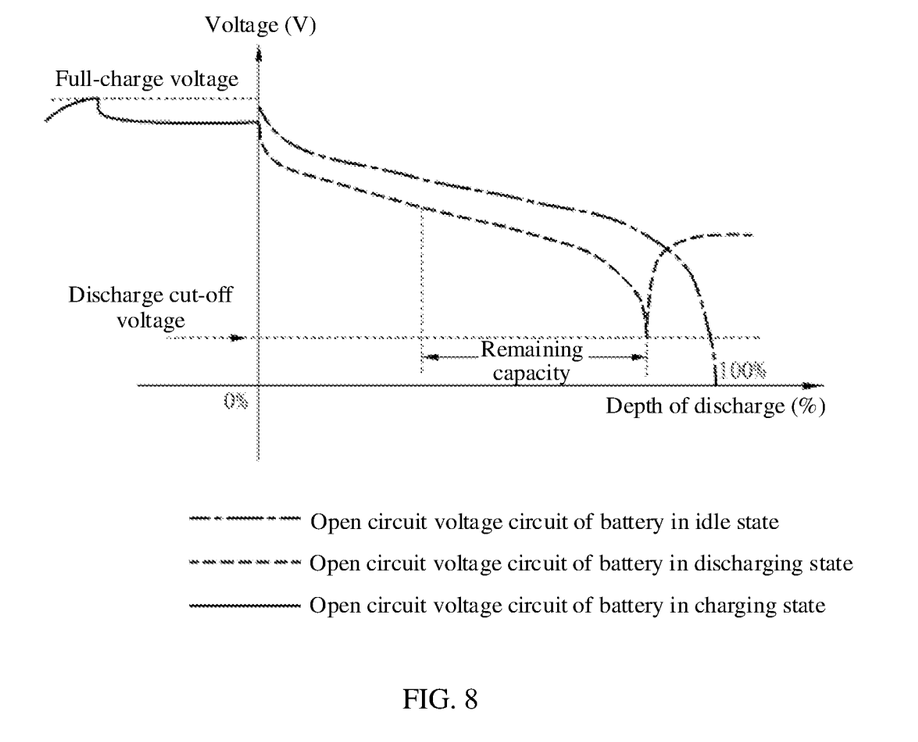
FIG. 8 is a curve showing open circuit voltages of a battery in different operating states.

Refer to FIG. 8. FIG. 8 is a curve showing open circuit voltages of the battery 23 in different operating states. The operating states include an idle state, a charging state, and a discharging state. A full-charge voltage and a charge cut-off voltage can be determined based on an open circuit voltage curve of the battery 23 in the charging state. A discharge cut-off voltage can be determined based on an open circuit voltage curve of the battery 23 in the discharging state, and the discharge cut-off voltage is the first undervoltage threshold $U_0$ or the second undervoltage threshold $U_e$. A depth of discharge variation of the battery 23 from the full-charge voltage to full discharge can be seen from an open circuit voltage curve of the battery 23 in the idle state. A depth of discharge variation of the battery 23 from the charge cut-off voltage to the discharge cut-off voltage and a voltage variation measured after discharge cutoff can be seen from the open circuit voltage curve of the battery 23 in the discharging state. Apparently, with reduction of the discharge cut-off voltage, the depth of discharge of the battery 23 increases accordingly, and the discharge capacity proportion of the battery 23 also increases accordingly.

In an implementation, the battery apparatus 20 can preset the second undervoltage thresholds $U_e$ within different temperature ranges, so as to select different undervoltage thresholds within the different temperature ranges, thus achieving dynamic adjustment of the undervoltage thresholds.

Table 2 shows undervoltage thresholds and discharge capacity proportions of the battery 23 within different temperature ranges. Firstly, the battery 23 is charged at a same charge rate (for example, 0.3 C) at a same temperature (for example, 25° C.). Secondly, the battery 23 is discharged at a same discharge rate (for example, 0.3 C) at different temperatures until the voltage of the battery 23 reaches a discharge cut-off voltage. The temperature ranges are specified. For example, a first temperature range is 15° C. to 45° C., a second temperature range is 0° C. to 15° C., a third temperature range is –10° C. to 0° C., and a fourth temperature range is –20° C. to –10° C. Lastly, discharge capacity proportions of the battery 23 within different temperature ranges at the first undervoltage threshold (for example, 2.8 V) and discharge capacity proportions of the battery 23 within different temperature ranges at the second undervoltage threshold (for example, 2.8 V, 2.4 V, 2.2 V, or 2.1 V) are determined. It can be learned from Table 2 that below 0° C., compared with a discharge capacity proportion of the battery 23 at the first undervoltage threshold (that is, the preset undervoltage threshold), the discharge capacity proportion of the battery 23 at the second undervoltage threshold (that is, a dynamically adjusted undervoltage threshold) increases significantly, indicating that adjusting the first undervoltage threshold to the second undervoltage threshold can significantly improve the discharge performance of the battery 23 at low temperatures. For example, within the fourth temperature range of –20° C. to –10° C., after the first undervoltage threshold (that is, 2.8 V) is adjusted to the second undervoltage threshold (that is, 2.1 V), the discharge capacity proportion of the battery 23 increases from 30% to 70%, greatly improving the discharge performance of the battery 23 at low temperatures.

TABLE 2

Undervoltage thresholds and discharge capacity proportions of battery 23 within different temperature ranges

| Charge/discharge rate | Temperature range | First undervoltage threshold | Discharge capacity proportion | Second undervoltage threshold | Discharge capacity proportion |
| --- | --- | --- | --- | --- | --- |
| Charge CC: 25° C., 0.3 C Discharge DC: 45° C., 0.3 C | 15° C. to 45° C. | 2.8 V | 102% | 2.8 V | 102% |
| Charge CC: 25° C., 0.3 C Discharge DC: 25° C., 0.3 C | | | 100.0% | | 100.0% |
| Charge CC: 25° C., 0.3 C Discharge DC: 15° C., 0.3 C | | | 96.5% | | 96.5% |
| Charge CC: 25° C., 0.3 C Discharge DC: 0° C., 0.3 C | 0° C. to 15° C. | | 75% | 2.4 V | 90% |

TABLE 2-continued

Undervoltage thresholds and discharge capacity proportions of battery 23 within different temperature ranges

| Charge/discharge rate | Temperature range | First undervoltage threshold | Discharge capacity proportion | Second undervoltage threshold | Discharge capacity proportion |
|---|---|---|---|---|---|
| Charge CC: 25° C., 0.3 C Discharge DC: −10° C., 0.3 C | −10° C. to 0° C. | | 60% | 2.2 V | 80% |
| Charge CC: 25° C., 0.3 C Discharge DC: −20° C., 0.3 C | −20° C. to 10° C. | | 30% | 2.1 V | 70% |

In an implementation, after step S34, the battery discharge undervoltage protection method may further include the following steps.

S35. Determine, based on the third voltage $U_3$ of the battery 23 after discharge cutoff and the second undervoltage threshold $U_e$, whether to perform undervoltage protection for the battery 23.

It can be understood that the battery apparatus 20 may acquire the third voltage $U_3$ through the battery management system. After discharge cutoff of the battery 23, there are two cases:

(1) The third voltage $U_3$ of the battery 23 is greater than the second undervoltage threshold $U_e$ (that is, $U_3>U_e$). To be specific, the third voltage $U_3$ has not reached the discharge cut-off voltage (that is, the second undervoltage threshold $U_e$). In this case, the battery 23 can continue to be discharged, and certainly no undervoltage protection is required for the battery 23.

(2) The third voltage $U_3$ of the battery 23 is equal to the second undervoltage threshold $U_e$ (that is, $U_3=U_e$). To be specific, the third voltage $U_3$ has reached the discharge cut-off voltage (that is, the second undervoltage threshold $U_e$). If the battery 23 continues to be discharged, it may cause irreversible capacity loss of the battery 23. In this case, undervoltage protection is required for the battery 23.

The following describes the foregoing step S35 in a specific application scenario.

It is assumed that the temperature of the battery 23 is −10° C., based on the preset first undervoltage threshold of 2.8 V, the second undervoltage threshold obtained after adjustment is determined as 2.2 V, that is, the discharge cut-off voltage is 2.2 V.

After discharge cutoff of the battery 23, when the third voltage acquired by the battery management system is 2.3 V, the third voltage of 2.3 V is greater than the discharge cut-off voltage of 2.2 V, indicating that the voltage of the battery 23 has not reached the discharge cut-off voltage of 2.2 V and the battery 23 can continue to be discharged, that is, no undervoltage protection is required for the battery 23.

When the third voltage acquired by the battery management system is 2.2 V, the third voltage of 2.2 V is equal to the discharge cut-off voltage of 2.2 V. If the battery 23 continues to be discharged, it may cause irreversible capacity loss of the battery 23. In this case, undervoltage protection is required for the battery 23.

It can be understood that after discharge cutoff of the battery 23, the third voltage $U_3$ changes dynamically and tends to be stable after a period of time. In this embodiment, the third voltage $U_3$ tending to be stable means that a change rate of the third voltage $U_3$ approaches 0 within a preset time period. In this embodiment, the third voltage $U_3$ tending to be stable is defined as a fourth voltage $U_4$.

In an implementation, whether to perform undervoltage protection for the battery 23 is determined based on the second undervoltage threshold $U_e$ and the fourth voltage $U_4$ measured after discharge cutoff of the battery 23.

Specifically, if the fourth voltage $U_4$ is greater than the second undervoltage threshold $U_e$ (that is, $U_4>U_e$), the battery 23 continues to be discharged. Specifically, if the fourth voltage $U_4$ is less than the second undervoltage threshold $U_e$ (that is, $U_4<U_e$), it is determined that undervoltage protection is to be performed for the battery 23.

Figure 9:
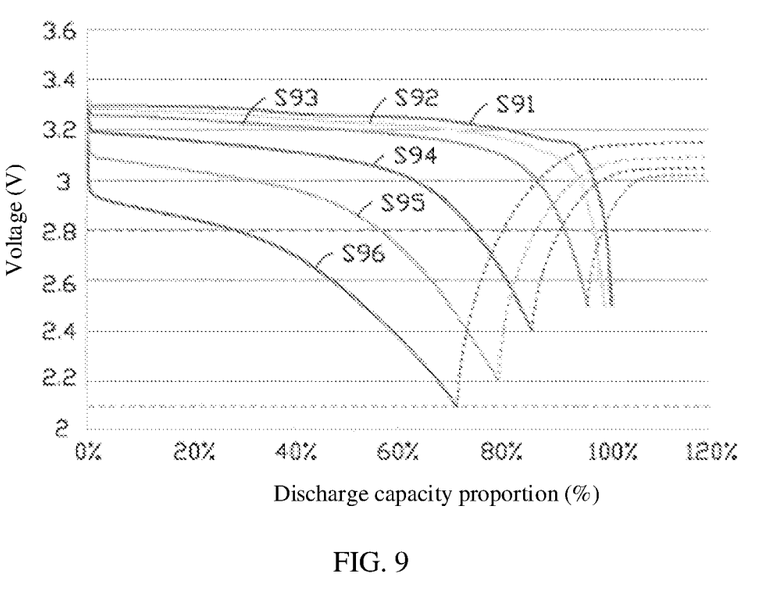
FIG. 9 is a curve showing open circuit voltages of a battery at different temperatures after discharge cutoff.

Refer to FIG. 9. FIG. 9 is a curve showing open circuit voltages of the battery 23 at different temperatures after discharge cutoff. S91 is a curve showing voltages and discharge capacity proportions at a discharge rate of 0.3 C at 45° C. S92 is a curve showing voltages and discharge capacity proportions at the discharge rate of 0.3 C at 25° C. S93 is a curve showing voltages and discharge capacity proportions at the discharge rate of 0.3 C at 15° C. S94 is a curve showing voltages and discharge capacity proportions at the discharge rate of 0.3 C at 0° C. S95 is a curve showing voltages and discharge capacity proportions at the discharge rate of 0.3 C at −10° C. S96 is a curve showing voltages and discharge capacity proportions at the discharge rate of 0.3 C at −20° C. In the curves S93, S94, S95, and S96, after the voltage has reached the second undervoltage threshold $U_e$, a dotted line part shows a rebound trend of the voltage.

The battery 23 is discharged at a same discharge rate (for example, 0.3 C) under different temperatures. Apparently, at the same discharge rate, different temperatures correspond to different second undervoltage thresholds $U_e$. As the temperature decreases, the second undervoltage threshold $U_e$ decreases correspondingly. When the temperature changes, the second undervoltage threshold $U_e$ needs to be dynamically adjusted.

In an implementation, the battery apparatus 20 may automatically adjust the second undervoltage threshold $U_e$ through the battery management system. For example, when the temperature decreases from −10° C. to −20° C., the battery management system correspondingly adjusts the second undervoltage threshold $U_e$ from 2.2 V to 2.1 V.

The foregoing describes some embodiments of this application in detail with reference to the accompanying drawings, but this application is not limited to the foregoing embodiments. Various variations may also be made without departing from the principle of this application in the knowledge scope of persons skilled in the related art. In addition, without conflict, some embodiments and the features in these embodiments of this application may be combined with each other.

What is claimed is:

1. A battery discharge undervoltage protection method, wherein the method comprises:
    acquiring a temperature and a first voltage of a battery;
    determining, based on the temperature, a depth of discharge of the battery;
    determining, based on the first voltage, a first remaining capacity proportion of the battery; and
    determining, based on the first remaining capacity proportion, the depth of discharge and a first undervoltage threshold, a second undervoltage threshold to increase a discharge capacity proportion of the battery, wherein the first undervoltage threshold is a preset undervoltage threshold, and the second undervoltage threshold is a dynamically adjusted undervoltage threshold.

2. The battery discharge undervoltage protection method according to claim 1, wherein the determining, based on the temperature, a depth of discharge of the battery comprises:
    determining a temperature range corresponding to the temperature; and
    determining, based on the temperature range, the depth of discharge corresponding to the temperature range.

3. The battery discharge undervoltage protection method according to claim 1, wherein the determining, based on the first voltage, a first remaining capacity proportion of the battery comprises:
    determining, based on a parameter correspondence of the battery, the first remaining capacity proportion corresponding to the first voltage, wherein the parameter correspondence refers to a correspondence between a remaining capacity proportion and an open circuit voltage.

4. The battery discharge undervoltage protection method according to claim 3, wherein the determining, based on the first remaining capacity proportion, the depth of discharge and a first undervoltage threshold, a second undervoltage threshold comprises:
    determining, based on the depth of discharge, a second remaining capacity proportion of the battery;
    determining, based on the parameter correspondence, a second voltage corresponding to the second remaining capacity proportion;
    determining, based on the second voltage and the first voltage, a voltage variation of the battery; and
    determining, based on the voltage variation and the first undervoltage threshold, the second undervoltage threshold.

5. The battery discharge undervoltage protection method according to claim 1, wherein after the determining, based on the first remaining capacity proportion, the depth of discharge and the first undervoltage threshold, a second undervoltage threshold, the method further comprises:
    acquiring a third voltage of the battery after discharge cutoff; and
    determining, based on the second undervoltage threshold and the third voltage, whether to perform undervoltage protection for the battery.

6. The battery discharge undervoltage protection method according to claim 5, wherein the determining, based on the second undervoltage threshold and the third voltage, whether to perform undervoltage protection for the battery comprises:
    determining a fourth voltage based on the third voltage; and
    determining to perform undervoltage protection for the battery under the condition that the fourth voltage is less than the second undervoltage threshold.

7. The battery discharge undervoltage protection method according to claim 3, wherein before the determining, based on a parameter correspondence of the battery, the first remaining capacity proportion corresponding to the first voltage, the method further comprises:
    charging the battery until a capacity of the battery reaches a full-charge capacity;
    acquiring a full-charge voltage corresponding to the full-charge capacity;
    discharging the battery until a voltage of the battery reaches a discharge cut-off voltage;
    acquiring a voltage and a state of charge corresponding to the voltage of the battery during discharging; and
    determining the parameter correspondence based on the voltage and the state of charge corresponding to the voltage.

8. The battery discharge undervoltage protection method according to claim 4, wherein the determining, based on the depth of discharge, a second remaining capacity proportion of the battery, comprises:
    100% minus the depth of discharge is the second remaining capacity proportion.

9. A battery apparatus, wherein the battery apparatus comprises a battery, a processor, and a memory; the memory stores a computer program; and when the computer program is executed by the processor, the battery discharge undervoltage protection method according to claim 1 is implemented.

10. An electric apparatus, wherein the electric apparatus comprises a load and the battery apparatus according to claim 9, and the battery apparatus is configured to provide electrical energy for the load.

11. The electric apparatus according to claim 10, wherein the electric apparatus comprises a drone, an electric vehicle, an electric tool, or an energy storage product.

* * * * *